United States Patent [19]

Hanna et al.

[11] Patent Number: 4,870,679
[45] Date of Patent: Sep. 26, 1989

[54] REPERTORY TELEPHONE DIALER WITH REMOTE BILLING CAPABILITY

[75] Inventors: Janice G. Hanna, Morristown, N.J.; Donald D. Huizinga, Indianapolis, Ind.; James M. Rulon, Randolph, N.J.; Wayne A. Weise, Noblesville, Ind.

[73] Assignees: American Telephone and Telegraph Company, New York, N.Y.; AT&T Information Systems Inc., Morristown, N.J.

[21] Appl. No.: 289,344

[22] Filed: Dec. 23, 1988

[51] Int. Cl.[4] .................... H04M 1/27; H04M 15/00
[52] U.S. Cl. ................................. 379/114; 379/355; 379/121
[58] Field of Search ............... 379/355, 356, 114, 126, 379/121, 115

[56] References Cited

U.S. PATENT DOCUMENTS

| | | | |
|---|---|---|---|
| 4,232,200 | 11/1980 | Hestad et al. | 179/90 |
| 4,243,845 | 1/1981 | Feinberg et al. | 179/90 |
| 4,275,273 | 6/1981 | S-Ling Ts'Ao | 179/90 |
| 4,475,013 | 10/1984 | Lee et al. | 179/90 |
| 4,567,326 | 1/1986 | Sato et al. | 179/90 |
| 4,720,849 | 1/1988 | Tayama et al. | 379/355 X |
| 4,791,640 | 12/1988 | Sand | 379/114 X |

Primary Examiner—Stafford D. Schreyer
Attorney, Agent, or Firm—Michael A. Morra

[57] ABSTRACT

A repertory telephone dialer includes a memory for storing two telephone numbers and one telephone call payment number. Activation of a switch on the dialer causes the first telephone number to be dialed; thereafter, the dialer responds to a Calling Card Service-Prompt Tone by transmitting the call payment number. The call payment number corresponds to a credit card number of the party to be billed for the call. The dialer is constructed as an adjunct device that connects to an existing telephone set by merely rearranging cords. Included on the front surface of the dialer is a recessed area that accommodates a photograph or graphic rendering of the party whose telephone number is dialed and who typically makes payment for the call. Activation of another switch on the dialer inhibits the remote billing feature by causing the second telephone number to be dialed.

17 Claims, 5 Drawing Sheets

REPERTORY TELEPHONE DIALER WITH REMOTE BILLING CAPABILITY

TECHNICAL FIELD

This invention relates to adjunct telephone equipment, and more particularly to repertory dialers.

BACKGROUND OF THE INVENTION

In many situations, it is desirable to encourage telephone communication from a particular class of persons. One class of persons comprises travelers at an airport who need encouragement to call a specific hotel for accommodations. Another class of persons comprises elderly parents or college students who need encouragement to call other family members to "keep in touch". A number of "encouragements" exist including telephones that automatically dial a predetermined number when the handset is lifted, and repertory dialing machines having a plurality of pre-programmed numbers. One product even includes large keys for dialing wherein each key accommodates a photograph of the person to be called. In this product, automatic dialing is commenced by first depressing a special key and then depressing the key containing the photograph. Such products however, frequently require special interconnections, auxiliary power, or replacement of an existing telephone set. Although such devices do encourage telephone usage, it is desirable to bring these and other features to existing telephone sets.

Accordingly, it is an object of the present invention to provide automatic dialing capability to an existing telephone with minimum inconvenience due to electric interconnection.

It is another object of the invention to further encourage the use of telephone communication in such a way that billing for the telephone call is automatically directed to a party other than the calling party.

SUMMARY OF THE INVENTION

A repertory telephone dialer includes a memory for storing at least one telephone number and storing telephone call payment information. The dialer also includes a switch which causes the telephone number to be dialed when it is activated. After the number is dialed, the dialer waits for a service-prompt tone and, in response thereto, transmits the telephone call payment information. The call payment information typically corresponds to the credit card number of the party to be billed for the call.

It is a feature of the present invention that the repertory dialer includes an area on a surface thereof for supporting a photograph or graphic rendering of the person or establishment to be called.

It is another feature of the present invention that remote billing can be de-activated by a manually operated switch on the repertory dialer.

It is another feature of the invention that the repertory dialer may be built into a single telephone set or into an adjunct device that readily connects to an existing telephone set.

It is yet another feature of the present invention that the repertory dialer is adapted to display a photograph preferably of the person or destination that will be called when the dialer is activated.

These and other objects and features of the present invention will be more fully understood when reference is made to the accompanying drawing and detailed description.

DETAILED DESCRIPTION

Figure 1:
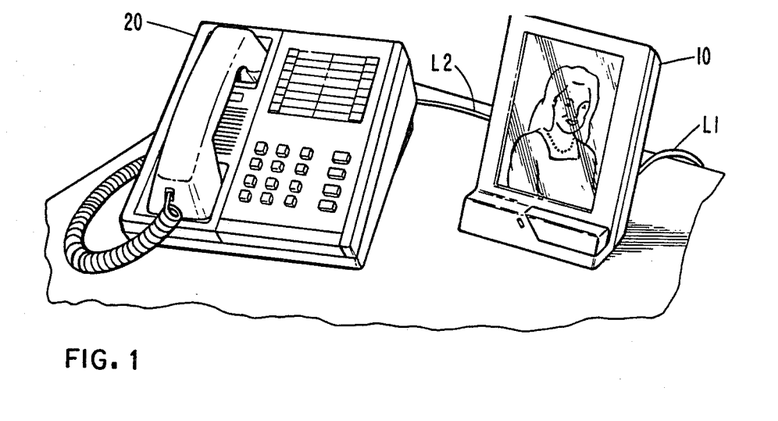
FIG. 1 illustrates a repertory dialer of the present invention and an associated telephone set in a typical installation.

The repertory dialer of the present invention is illustrated in FIG. 1 in a typical environment. Repertory dialer 10 is pre-programmed, single number dial adjunct having third-party billing capability. In order to stimulate calling, the dialer is pre-programmed at a centralized programming center with a telephone number to be called and a billing number, such as an AT&T "CALL ME" card number. Once programmed, dialer 10 is given to the purchaser who inserts a photograph or other suitable graphic rendering of herself and sends it to a recipient such as a grandparent or a college student. Alternatively, the purchaser may wish to insert a photograph of his establishment for use in a commercial setting. In either case, the front surface of the dialer includes a recessed area for supporting such a photograph of graphic rendering.

To activate the dialer, the recipient simply lifts the handset of associated telephone 20, pushes a button (S1-shown in FIG. 2) on the front surface of repertory dialer 20, waits a few seconds for the connection to be completed, and begins conversation. Typically the conversation is with, and paid for by, the party whose photograph or graphic rendering is affixed to the repertory dialer. Options include direct/remote billing and touch-tone/dial pulse dialing. These options are respectively accessed by switches S2 and S3 which are positioned on the back surface of the repertory dialer 20.

Figure 2:
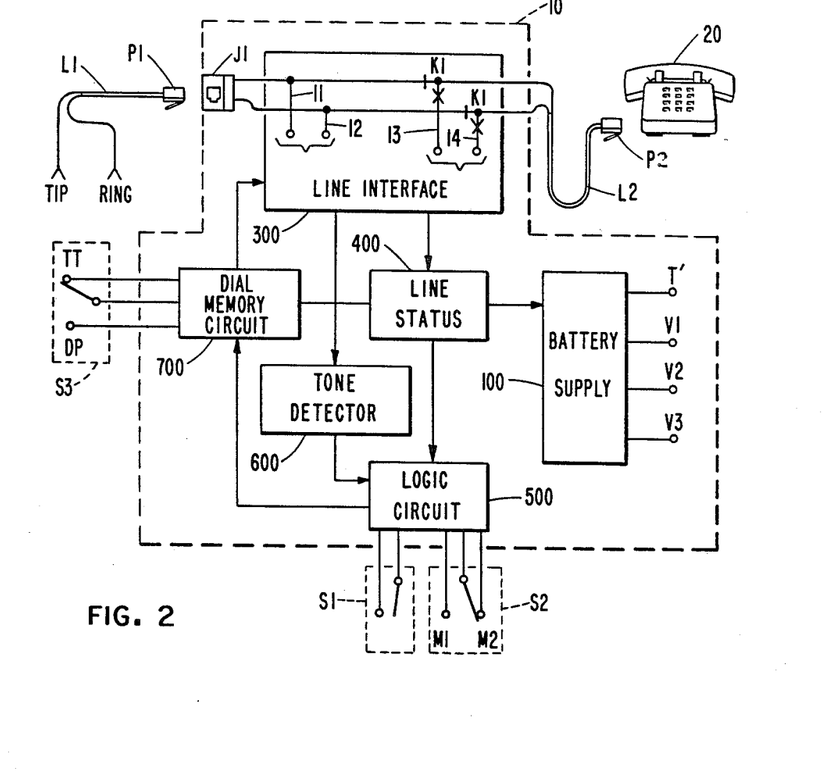
FIG. 2 is a block diagram of the repertory dialer designed in accordance with the invention.

FIG. 2 is a block representation of a repertory telephone dialer in accordance with the present invention. Dialer 10 is shown interconnected between the incoming telephone line L1 and associated telephone set 20. Installation of the repertory dialer 10 is a relatively simple task. A customer merely disconnects modular plug P1 from telephone set 20 and reconnects it to modular jack J1 on the dialer. The dialer comes equipped with a short length of cord L2 that terminates in modular plug P2 which is then connected to telephone set 20. The installation is now complete. The dialer is pre-programmed to perform the required dialing with power supplied to internal batteries to thus avoid the need for connection to commercial power.

Line interface 300 is adapted to buffer electric signals entering repertory dialer 10 on wires 11,12 which connect tip and ring from telephone line L1 to circuitry within the line interface. A pair of transfer contacts from relay K1 is used to regulate which electric signals are connected to telephone set 20. In their normal state, the contacts of relay K1 connect telephone set 20 directly to the telephone line. When relay K1 is activated, however, telephone set 20 is connected to circuitry within the line interface 300 on wires 13, 14 to receive a small amount of DC current and sidetone for call progress monitoring. Functions performed by line interface 300 include polarity reversal protection, line holding, current limiting and connection of dial pulse or touch-tone signals to telephone line L1. Selection of dial pulse or touch-tone signals is achieved by operation of switch S3 to the DP or TT position respectively.

Dial memory circuit 700 stores at least three numbers M1, M2, M3. M1 corresponds to a telephone number to be dialed having the following example format: 1+Area Code+seven digit number. M2 corresponds to a telephone number to be dialed having the following example format: Long Distance Access Code+Area Code+seven digit number. One suitable Long Distance Access Code is 102880 which selects AT&T as the long distance carrier. M3 contains billing data such as a credit card number. It is noted that M1 and M2 correspond to the same telephone number. M1 is dialed when billing is to be paid by the party at the calling number whereas M2 is dialed when billing is to be directed to the owner of the credit card number stored in M3. The user of repertory dialer 10 may select, via switch S2, whether M1 or M2 is to be dialed. When the user is ready to make a call, switch S1 is momentarily operated and dialing of the selected number, M1 or M2, commences.

In a situation whereby M2 is dialed, the long distance carrier recognizes M2 as a credit card call and returns the Calling Card Service-Prompt Tone, also known as the "bong" tone, which comprises 60 milliseconds of the tone-pair 941 Hz and 1477 Hz, followed immediately by 940 milliseconds of the tone-pair 440 Hz and 350 Hz. The later tone-pair decays exponentially from −10 dBM per frequency at −3 TLP with a time constant of 200 milliseconds. This bong tone is detected by tone detector 600 which forwards the information to logic circuit 500. Thereafter logic circuit 500 causes dial memory circuit 700 to deliver the credit card number M3 to line interface 300 and hence to telephone line L1 so that remote billing might occur.

Battery supply 100 comprises a 9-volt battery whose positive output, designated T', serves as a ground reference. Battery supply 100 further comprises voltage regulation circuitry to provide three output voltages, designated V1, V2 and V3, having nominal magnitudes of −5.0, −5.0, and −8.3 volts respectively. To prolong battery life, voltages V1 and V3 becomes 0 volts when the associated telephone set 20 is on-hook. A permanent 3-volt lithium battery is provided to preserve the contents of dial memory circuit 700 when the 9-volt battery needs replacing. The lithium battery is connected in such a manner that voltage V2 becomes −2.6 volts when the associated telephone set is on-hook or when the 9volt battery is removed. Since commercial power could be used to operate the repertory dialer and since the power supply is ancillary to the invention, details regarding the construction of battery supply 100 are omitted.

LINE INTERFACE CIRCUIT

Line interface 300 is permanently connected to telephone line L1 over wire-pair 11, 12. Normally closed contacts of relay K1 and line L2 provide electrical connection between telephone station 20 and incoming telephone line L1. When repertory dialer 10 is activated, the transfer contacts of relay K1 operate to disconnect telephone set 20 from line L1 although sidetone is supplied to the telephone set over wire-pair 13, 14 and line L2. Such sidetone allows the user to monitor call progress. Once the repertory dialer 10 had completed dialing, relay K1 returns to its normal, non-activated state and telephone set 20 is directly connected to the telephone line.

Figure 3:
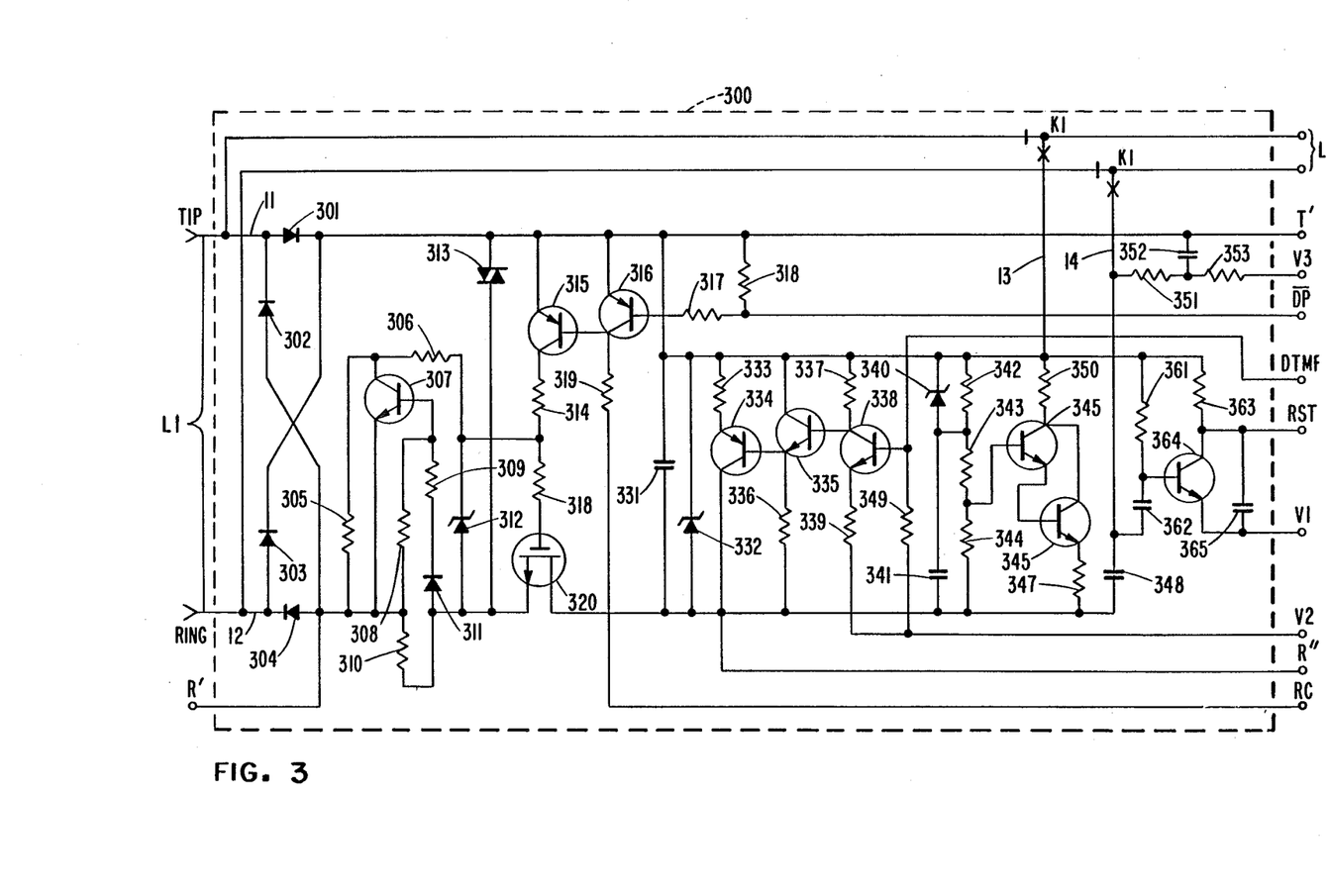
FIG. 3 is a detailed schematic drawing of a line interface circuit used in the repertory dialer of the present invention.

Referring to FIG. 3 there is disclosed a detailed schematic drawing of line interface 300. A polarity guard circuit, comprising diodes 301–304 assures that reversals of tip and ring on wire-pair 11, 12 do not affect operation of the repertory dialer. Protection against excessive current is offered by components 305–312 which provide negative DC feedback to transistor 320. Resistor 310 is a half-watt carbon composition resistor able to withstand higher currents than the other components in line interface 300. High voltage (lightning) protection is provided by component 313 which is a 240-volt metal oxide varistor.

Components 314–320 are responsive to binary signals on input lead $\overline{DP}$ which provide loop disconnect (pulse) dialing when the user has selected mode "DP" via switch S3 (see FIG. 1 and 7) rather than mode "TT" which provides touch-tone dialing. Component 320 is an N-channel MOSFET transistor which performs electronic dialing of pre-programmed digits by turning on and off at the appropriate rate. Interdigit timing is discussed in connection with FIG. 5, where it is provided by components 526–532.

When touch-tone dialing is selected via switch S3 (see FIG. 3 and 5), components 333–339 and 349 are responsive to a dual tone multi-frequency signal on input lead DTMF for amplifying and impedance matching same to telephone line L1. Capacitor 331 provides filtering across the line and Zener diode 332, having a 15-volt breakdown, serves to protect components of line interface 300 from transient voltages on the telephone line.

Components 340–347 and 350 perform the line holding function. Bias resistors 342–344 and 347 cooperate to set the voltage at the base of transistor 345. Darlington pair 345–346 regulates the line holding current in accordance with the voltage across terminals T' and R". 4.7 volt Zenor diode 340 is used for dial pulse wave shaping. Diode 340 charges capacitor 341 rapidly at the start of each make period which sets the DC voltage across terminals T' and R". Capacitor 341 and resistor 342 set the AC impedance of the line holding circuit.

When relay K1 is operated and the associated telephone set is not directly connected to the telephone line L1, capacitor 348 couples a portion of the AC signal on lead R" to the telephone set via leads 13, 14. Components 351–353 supply a filtered negative DC voltage to the telephone set over lead 14. Should the user hang up the associated telephone set during dialing, the voltage on lead 14 becomes more negative. This negative signal is coupled through capacitor 362 to a reset circuit comprising components 361–365 which causes output lead RST to go high. The signal on lead RST is used to reset a flip-flop, comprising gates 515, 516 shown in FIG. 5, that indicates the dialing condition. So that dial pulse are not confused with telephone hangup, the voltage on lead RST is clamped negative during dialing. Such clamping is performed by diode 525, also shown in FIG. 5.

LINE STATUS CIRCUIT

Figure 4:
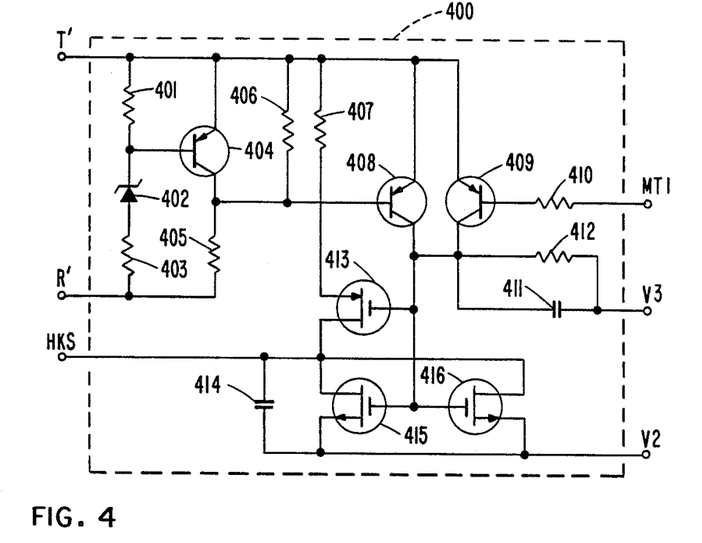
FIG. 4 is a detailed schematic drawing of a line status circuit used in the repertory dialer.

Turning now to FIG. 4, line status circuit 400 functions to determine the on-hook/off-hook status of associated telephone set 20 (see FIG. 1 and 2). This function is performed by monitoring the DC voltage level across terminals T' and R'. Advantageously, the polarity guard comprising diodes 301-304 (see FIG. 3) assures that T' is always positive with respect to R'. Zenor diode 402 has a 22-volt breakdown voltage so that when the voltage across T', R' is less than 22 volts, transistor 404 is turned off. This occurs when the associated telephone set is in an off-hook state. Resistors 401, 403, 405 and 406 are used to bias transistor 404 and produce the proper voltage levels in its on/off states. When transistor 404 is turned off, the voltage at its collector terminal becomes more negative thus turning transistor 408 on. Similar action occurs in transistor 409 when input lead MT1 becomes negative during dialing. Thus during dialing, or when the associated telephone set is off-hook, the collectors of transistors 408, 409 are at their high voltage level T'. Also during the off-hook condition, voltage V2 is at −5.0 volts nominally and V3 is at −8.3 volts nominally. Components 411, 412 provide filtering and bias respectively for the signal developed at the collectors of transistors 408, 409. This signal is delivered to components 413-416 which provide level shifting to deliver a voltage on output lead HKS whose level is low (−5.0 volts) during the off hook condition and whose level is high (0 volts) during the on-hook condition.

LOGIC CIRCUIT

Figure 5:
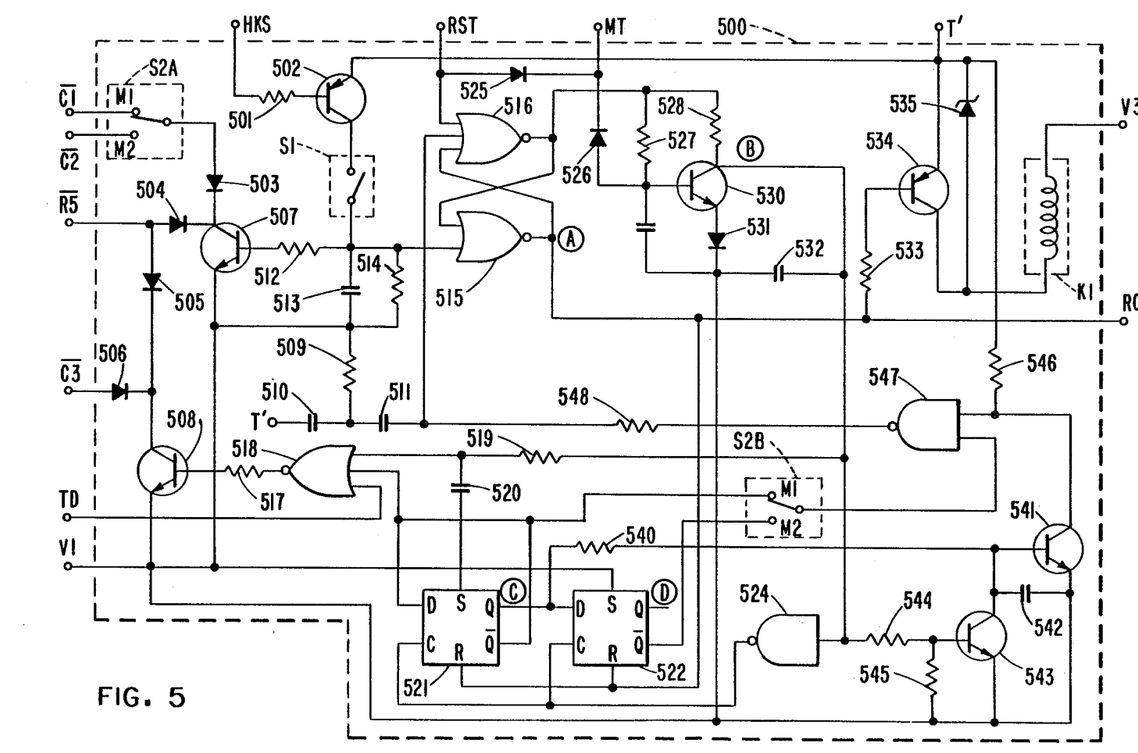
FIG. 5 is a detailed schematic drawing of a logic circuit used in the repertory dialer of the present invention.

FIG. 5 us a schematic drawing of the logic circuit used in the present invention to regulate the various tasks of the repertory dialer. A user, desirous of commencing a call, must first lift the handset of the associated telephone. This condition is sensed by the line status circuit, as discussed above, which drives the voltage T' at its collector terminal when the user depresses switch S1 momentarily in order to activate the dialer. Resistor 501 is used to limit the current flowing in the base of transistor 502. Once S1 is activated, the high voltage at the collector of transistor 502 is filtered by capacitor 513 and used to toggle the flip-flop comprising gates 515, 516; and to select the telephone number to be dialed via transistor 507, diodes 503-504, and switch S2A. S2 is a two-position, double-throw switch comprising elements S2A and S2B, used by customer to select direct billing (position M1), or remote billing (position M2). In the M1 position, leads R5 and C1 are driven low to commence dialing of the telephone number stored in M1. In the M2 position, leads R5 and C2 are driven low to commence the dialing of the telephone number stored in M2.

Figure 8:
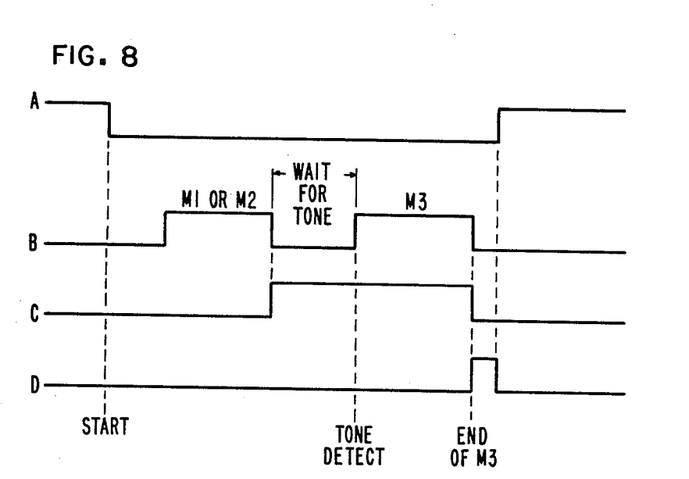
FIG. 8 illustrates waveforms at various locations within the logic circuit of FIG. 5.

Waveforms associated with the logic circuit of FIG. 5 are shown in FIG. 8 to more clearly illustrate its operation. The output signal of gate 515, also known as the "start" signal is shown in FIG. 8 as waveform A and is available on output lead RC. The start signal is delivered to the base of transistor 534 through current limiting resistor 533 to energize the coil of relay K1. Zenor diode 535 protects transistor 534 from the high voltage transient created when relay coil K1 is released. Operation of the K1 relay causes associated telephone set 20 to be disconnected from telephone line L1 and connected to leads 13, 14 of repertory dialer 10 where it is supplied with approximately 3.5 milliamps of DC as well as sidetone for call progress monitoring (see FIG. 2). The start signal is also used to remove the reset signal from flip-flops 521, 522 whose output signals are shown are shown as waveforms C and D in FIG. 8. They are now free to change states.

An interdigit timing circuit comprising components 526-532 provides inversion, with minimum delay, of its input signal on lead MT when it goes low (−5.0 volts) during dialing. Since lead MT remains low during touch-tone dialing, the voltage on the collector of transistor 530 remains high (see waveform B of FIG. 8). During dial pulse dialing lead MT goes high during the interdigit intervals for 740 milliseconds, but the voltage on the collector of transistor 530 remains high due to the time constant of resistor 527 and capacitor 529. Diode 531 assures that there is sufficient reverse bias for transistor 530 to turn it off when lead MT is low. After the telephone number is dialed (M1 or M2), the signal on lead MT goes high(0 volts); however, a one-second delay is encountered before the output of the interdigit timer goes low due to the time constant of resistor 527 and capacitor 529.

Flip-flops 521, 522 are D flip-flops that transfer a logic signal present on their D input whenever a positive-going transition is present on their C (clock) input. Flip-flop 521 has its $\overline{Q}$ output connected to its D input causing it to toggle on every positive-going transition delivered to its C input. After the dialing of M1 or M2 is completed, waveform B has a negative-going transition which is inverted by gate 524 and delivered to the C input of flip-flops 521, 522. Only flip-flop 521 toggles at this time (see waveform C).

If the user has positioned switch S2 in the M1 position (direct billing), then gate 547 receives a low voltage on its input lead from the $\overline{Q}$ output of flip flop 521. Since a low voltage on any input lead of gate 547 forces its output high, a high signal is delivered to gate 516 through resistor 548. This signal forces the flip-flop comprising gates 515, 516 to be reset thus ending the dialing cycle. Accordingly, the repertory dialer does not expect to receive a Calling Card Service-Prompt Tone when direct billing is selected.

If, on the other hand, the user has positioned switch S2 in the M2 position (remote billing), the input to gate 547 remains high so that its output is low and does not force the flip-flop comprising gates 515, 516 to be reset at this time. Regardless of the position of S2, however, immediately after dialing, flip-flop 521 is toggled and its Q output (waveform C ) is delivered to a timer comprising components 540-546 having a ten-second delay set by resistor 540 and capacitor 542. Transistor 541 inverts and amplifies its input signal. Whether or not a Calling Card Service-Prompt Tone is detected, within 10 seconds after M1 or M2 has been dialed, the output of transistor 541 is driven low thereby forcing gate 547 to go high and thus reset the flip-flop comprising gates 515, 516 and the repertory dialer is now ready to start all over again.

Whenever the Calling Card Service-Prompt Tone is absent, input lead TD to gate 518 is high thus forcing the output of gate 518 to be low which holds the collector of transistor 508 high. Whenever the Calling Card Service-Prompt Tone is present, lead TD is low. Since the other two inputs to gate 518 are also low after a telephone number has been dialed, the output of gate 518 now goes high and turns on transistor 508. Transistor 508 provides a low voltage to diodes 505, 506 and hence output leads $\overline{R5}$, $\overline{C3}$ respectively to thereby cause dial memory circuit 700 (see FIG. 7) to dial the number M3. Note that M3 corresponds to a credit card number, or the like, of the person to be billed for the telephone call. After the dialing of M3 is completed, lead MT goes high which turns on transistor 530 after a one-second delay and delivers a positive-going transition at the output of gate 524 to the C inputs of flip-flops 521, 522. This transition causes the Q output of flip-flop 521 to go low and flip-flop 522 to go high. The $\overline{Q}$ output of flip-flop 522 therefore goes low thus forcing the output of gate 547 high and resetting the flip-flop comprising gates 515, 516. The output of gate 515 (waveform A) is fed back to the reset (R) inputs of flip-flops 521, 522 thereby assuring that each of their Q outputs is in its low state. The repertory dialer has now completed its dialing cycle.

In the event a new battery is inserted, capacitors 510–511, in cooperation with resistor 509, couple a high signal to an input of gate 516 to assure that the flip-flop comprising gates 515, 516 is in its reset state.

TONE DETECTOR

Figure 6:
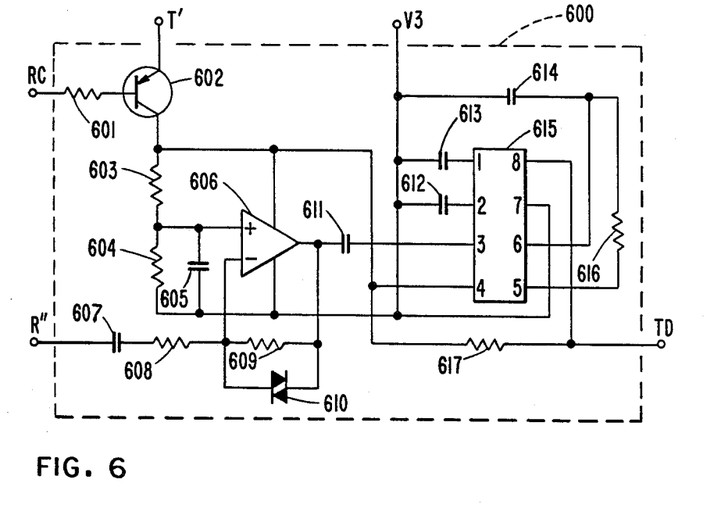
FIG. 6 is a detailed schematic drawing of a tone detector used in the repertory dialer of the present invention.

Referring now to FIG. 6, there is disclosed a schematic drawing of tone detector 600 which operates to detect the 941 Hz component of the Calling Card Service-Prompt Tone. Tone detector 600 is enabled when power (T′) is applied via transistor 602 which occurs when input lead RC is low (see waveform A—FIG. 5 and 8). Input lead RC is driven low when S1 is operated to commence dialing. Power is supplied to the integrated circuit 615 on its pin 4. This particular integrated circuit operates in the power supply voltage range 4.75 – 9.0 volts and typically uses 5.0 volts. After the dialing cycle is completed, input lead RC is driven high thus removing power from the tone detector 600.

Input lead R″ delivers signals present on the telephone line to the tone detector 600. The signals on input lead R″ are amplified by amplifier 606 which is a commercially available amplifier such as the LM358 Operational Amplifier. Varistor 610 limits the magnitude of the amplified signal and components 603–605 and 608–609 are selected for proper biasing and gain setting.

Integrated circuit 615 is a commercially available Tone Decoder such as the LM567; adapted, by externally connected components 611–614 and 616–617, to detect a tone having a frequency component of 941 Hz. The input signal to integrated circuit 615 is capacitively coupled via capacitor 611 to its pin 3; and the output signal, which is normally high, is available on pin 8. The externally connected components are used to independently set center frequency, bandwidth and output delay. When the input signal contains a 941 Hz frequency component, integrated circuit pin 8 (output lead TD) provides a saturated transistor switch to the low voltage (V3) connected to pin 7. Although the Calling Card Service-Prompt Tone contains more than a 941 Hz frequency component, in the present application this simplified technique advantageously provides sufficient accuracy while minimizing cost.

DIAL MEMORY CIRCUIT

Figure 7:
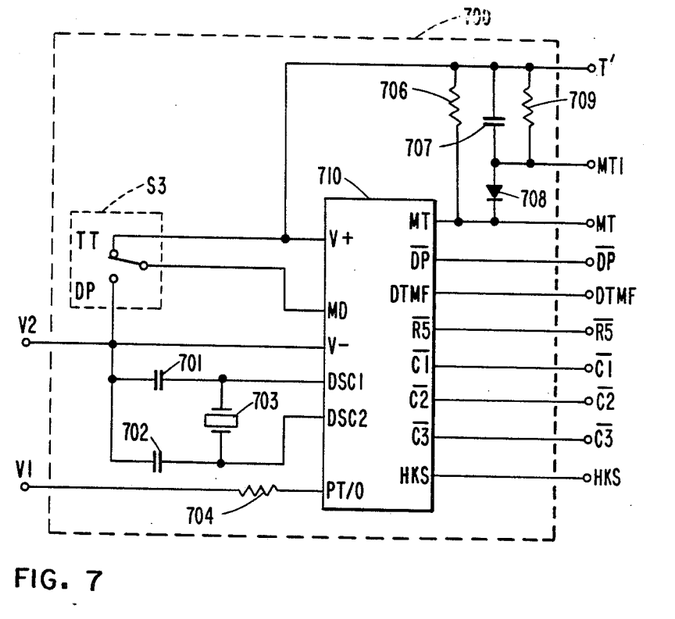
FIG. 7 is a detailed schematic drawing of a dial memory circuit used in the repertory dialer.

Referring now to FIG. 7, integrated circuit 710 is a commercially available repertory dialer chip such as the MK53762 which stores up to nine repertory numbers, each containing up to 18 digits. These numbers can be later redialed with a single key input. In the present invention only three memory locations are used: M1, M2 and M3; these memory locations are respectively addressed when a low voltage (−5.0 volts) is simultaneously presented on the $\overline{R5}$ input along with one of the $\overline{C1}$, $\overline{C2}$ or $\overline{C3}$ input leads.

Mode switch S3 allows the user to select between touch-tone or dial pulse dialing. When the touch-tone mode is selected, conventional touch-tone signals are available on the DTMF output lead for as long as the user holds the particular key depressed. Component 703 is a conventional low-cost television color-burst crystal having a nominal frequency of 3.579545 MHz. The crystal in combination with capacitors 701, 702 and circuitry within integrated circuit 710 cooperate to provide the time reference for all circuit functions including the DTMF output frequencies. Alternatively, a ceramic resonator having a tolerance of ±0.25% may be used in place of crystal 703. When mode switch S3 is in the DP position, the user has selected the dial pulse mode of operation in which the output signal on lead DP consists of an open drain N-channel device along with pull-up resistor 318 on FIG. 3 whose output comprises a sequence of negative-going output pulses, each having a duration of 60 milliseconds, on lead DP. The number of pulses corresponds to the digit dialed. Between digits the interdigit time is 740 milliseconds.

Lead MT delivers an output signal which comprises an open drain N-channel device. During standby, this is a high impedance connected to supply voltage T′ through external pull-up resistor 706. When dialing, MT is low (−5.0 volts) continuously until dialing is completed except during the interdigit interval in dial pulse operation.

Input lead HKS provides an indication of the state of the line switch in the associated telephone set. It is high (0 volts) when the telephone set is on-hook, or low (−5.0 volts) when the telephone set is off-hook. It is noted that line status circuit 400, discussed in connection with FIG. 4, determines the state of the line switch and hence the voltage level on lead HKS. Components 707–709 are used to buffer the MT signal for delivery to the line status circuit of FIG. 4. The buffered MT signal is renamed MT1.

Although a particular embodiment has been disclosed, it is understood that various modifications may be made within the spirit and scope of the invention. Such modifications include, but are not limited to, the inclusion of the repertory dialer within a single telephone set structure; the billing for telephone calls, made from the repertory dialer, to someone other than the calling or called party; and automatic activation of the dialer when the user goes off-hook.

We claim:

1. Automatic dialing apparatus including means storing a first dialing signal, means responsive to the operation of a first switch for delivering the first dialing signal to a telephone line CHARACTERIZED BY:
means storing a payment information signal; and
means responsive to a payment information request signal, received from the telephone line, for delivering the stored payment information signal to the telephone line.

2. The automatic dialing apparatus of claim 1 further characterized by:

means storing a second dialing signal; and means responsive to the operation of a second switch for causing the second dialing signal to be delivered to the telephone line, rather than the first dialing signal, when said first switch is operated.

3. The automatic dialing apparatus of claim 1 wherein the payment information request signal includes a frequency component of approximately 941 Hz.

4. The automatic dialing apparatus of claim 1 further including a photograph or graphic rendering on a front surface of the apparatus, said photograph or graphic rendering being indicative of the party to be dialed by operation of the first switch.

5. The automatic dialing apparatus of claim 1 wherein the first dialing signal includes a Long Distance Access Code.

6. The automatic dialing of claim 5 wherein the payment information signal corresponds to a credit card number or the like, whereby payment for telephone calls made using the automatic dialing apparatus is directed to a party other than the calling party.

7. The automatic dialing apparatus of claim 6 further including a photograph or graphic rendering on a front surface of the apparatus, said photograph or graphic rendering being indicative of the party making payment for the telephone call.

8. An adjunct telephone dialer, the dialer including means for making electrical connection to a telephone set and to a telephone line, said dialer being dedicated to automatically dialing one particular party, said dialer including a picture or momento of the particular party affixed to one surface thereof, and the dialer further including means for causing billing for telephone calls made using the dialer to be directed to said particular party.

9. The adjunct telephone dialer of claim 8 further including a switch for inhibiting the billing of calls to said particular party.

10. In combination, a telephone set and a repertory dialer, the telephone set comprising:
a handset;
a base for supporting the handset;
a line switch having two states, said line switch being in an on-hook state when the handset and base are joined, and in an off-hook state when the handset and base are separated; and
a first jack, adapted to make electrical connection with a plug inserted therein, the repertory dialer comprising:
a line interface circuit including a wire-pair terminated in a first plug and connected to the first jack on the telephone set, the line interface further including a second jack interconnected with a second plug that terminates a telephone line;
a line status circuit, responsive to the DC voltage across the telephone line for determining the state of the line switch in the telephone set;
a memory circuit storing a first telephone number and a payment number;
a tone detector for detecting the presence of a predetermined tone on the telephone line;
a logic circuit, jointly responsive to the operation of a first switch and to an indication from the line status circuit that the telephone set is off-hook, for commencing the dialing of the stored first telephone number; and
the logic circuit being further responsive to an indication from the tone detector circuit that the predetermined tone in present on the telephone line, for commencing the dialing of the stored payment number.

11. The combination of claim 10 wherein the memory circuit of the repertory dialer stores a second telephone number, and wherein the repertory dialer further includes a second switch having at least two positions, the logic circuit being responsive to the second switch for commencing the dialing of the first telephone number when the second switch is in one position, and commencing the dialing of the second telephone number when the second switch is in another position.

12. The combination of claim 10 wherein the repertory dialer further includes a dialing circuit for converting stored numbers in the memory circuit into electrical signals for connection to the telephone line, the dialing circuit being responsive to a third switch for providing dual tone multi-frequency (DTMF) dialing signals or line disconnect (pulse) dialing signals.

13. Apparatus interconnecting a telephone set with a telephone line wherein the telephone set includes a first jack and the telephone line is terminated in a first plug, said apparatus including a second jack receiving the first plug and further including a wire-pair terminated in a second plug for connection to the first jack of the telephone set CHARACTERIZED BY:
memory means for storing a first and second sequence of digits the first sequence of digits corresponding to a complete telephone number and the second sequence of digits corresponding to a payment information signal;
means responsive to the activation of a first switch on the apparatus for causing the first sequence of digits to be read out of the memory means;
means responsive to a payment information request signal received from the telephone line for causing the second sequence of digits to be read out of the memory means; and
means converting sequences of digits, read out of the memory means, into sequences of tones or dial pulses for connection to the telephone line.

14. The apparatus of claim 13 wherein the payment information request signal includes a frequency component of approximately 941 Hz.

15. The apparatus of claim 13 further including means responsive to DC voltage levels on the telephone line for determining when the telephone set is in an on-hook state, the apparatus being further characterized by means for inhibiting the read out of digits from the memory means when the telephone set is in the on-hook state.

16. The apparatus of claim 13 wherein the memory means additionally stores a third sequence of digits, the apparatus being further characterized by a second switch, which in one position causes the first sequence of digits to be read out of memory after the first switch is activated, and in another position causes the third sequence of digits to read out of memory after the first switch is activated; whereby the user of the apparatus may choose between two telephone numbers to be dialed.

17. The apparatus of claim 13 further including a photograph or graphic rendering on a front surface of the apparatus, said photograph or graphic rendering being indicative of the party to be called by activation of the first switch.

* * * * *